A. I. FUSMAN.
ROTARY CUTLASS.
APPLICATION FILED MAR. 19, 1919.
1,369,736.
Patented Feb. 22, 1921.
3 SHEETS—SHEET 1.
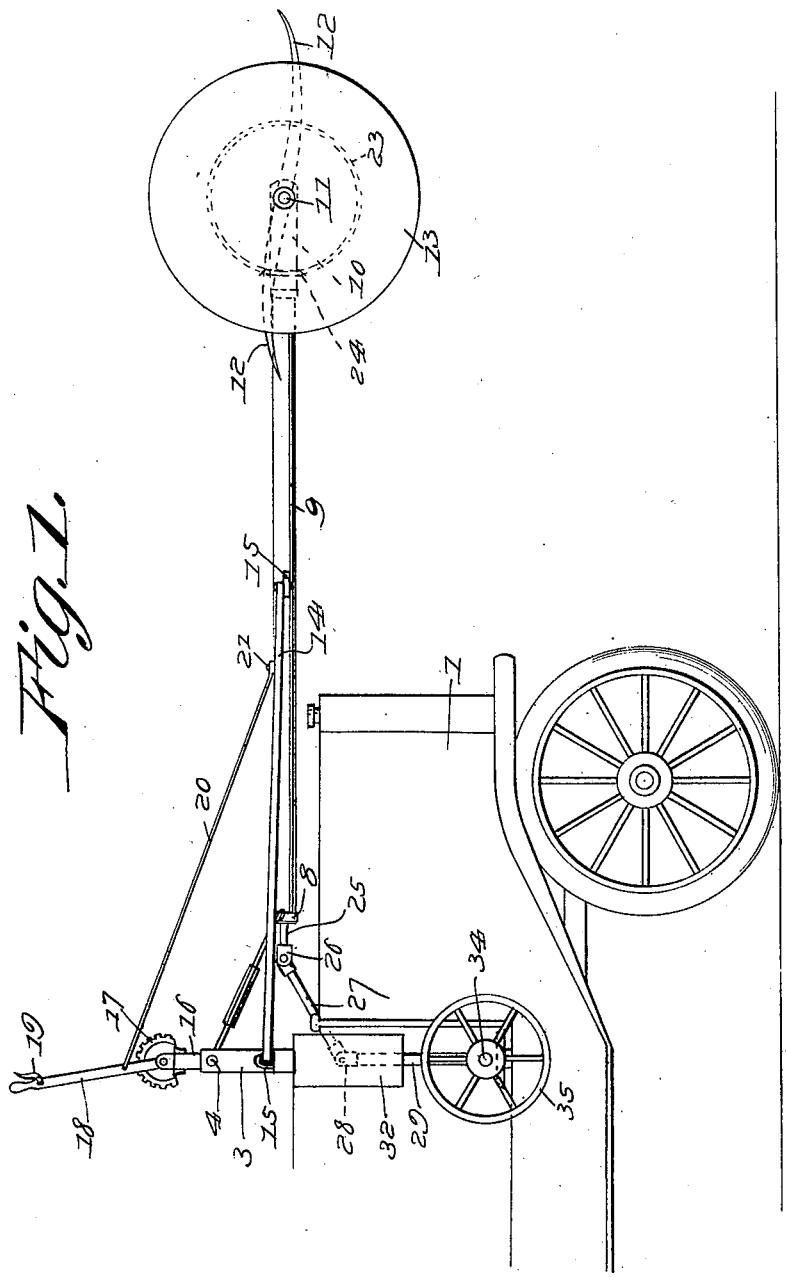
Inventor
A. I. Fusman,
By R. Hume Talbert Attorney A. I. FUSMAN.
ROTARY CUTLASS.
APPLICATION FILED MAR. 19, 1919.
1,369,736.
Patented Feb. 22, 1921.
3 SHEETS—SHEET 2.
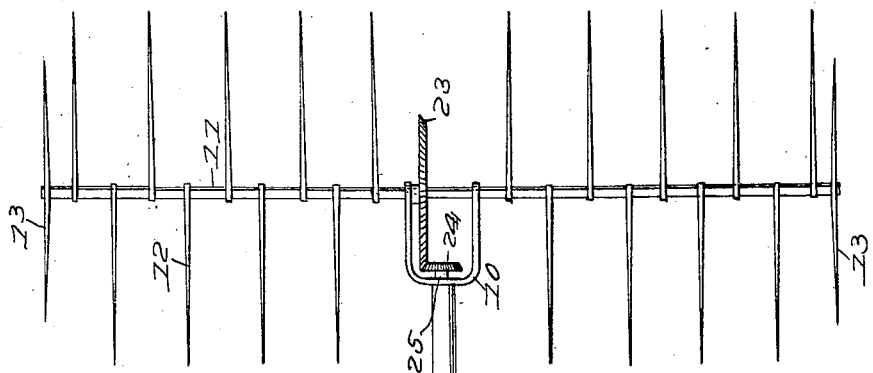
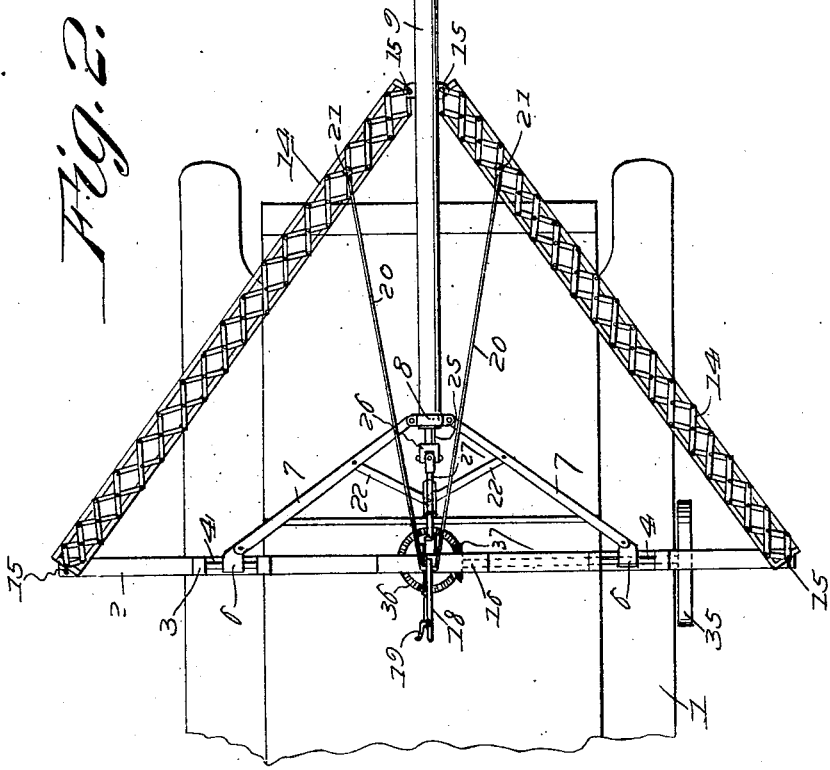
Inventor
A. I. Fusman,
By G. Hume Talbert, Attorney A. I. FUSMAN.
ROTARY CUTLASS.
APPLICATION FILED MAR. 19, 1919.
1,369,736.
Patented Feb. 22, 1921.
3 SHEETS—SHEET 3.
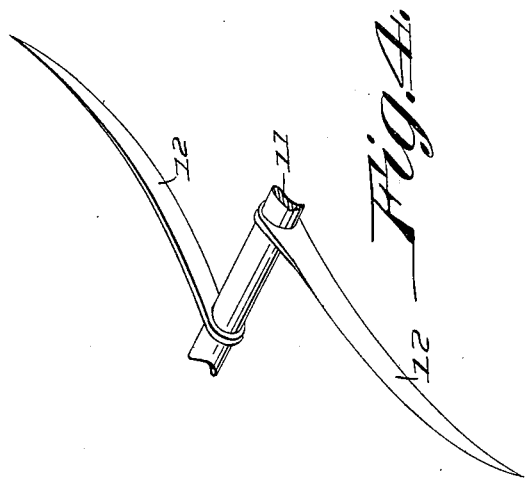
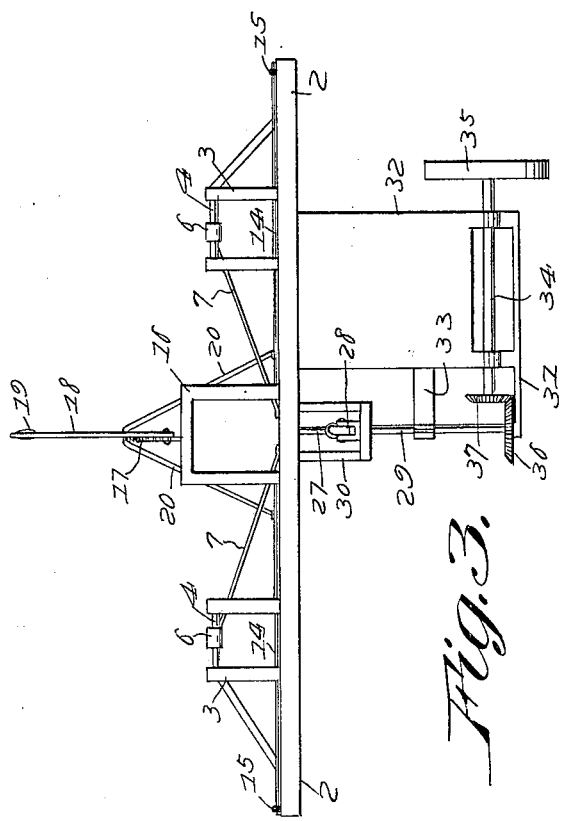
Inventor
A. I. Fusman,
By
Attorney

UNITED STATES PATENT OFFICE.

ANDREW I. FUSMAN, OF ORIENT, SOUTH DAKOTA.

ROTARY CUTLASS.

1,369,736.  Specification of Letters Patent.  Patented Feb. 22, 1921.

Application filed March 19, 1919. Serial No. 283,455.

*To all whom it may concern:*

Be it known that I, ANDREW I. FUSMAN, a citizen of the United States of America, residing at Orient, in the county of Faulk and State of South Dakota, have invented new and useful Improvements in Rotary Cutlasses, of which the following is a specification.

The purpose of the invention is to provide an apparatus for use in warfare, the apparatus being particularly designed for mounting upon an auto vehicle or auto truck and comprising a plurality of rotatably mounted blades or cutlasses, which will stand out beyond the forward end of the vehicle or truck on which they are carried, thus providing a simple but effective device for use in warfare.

As shown and described, a specific embodiment of the invention is adhered to, but to this embodiment the invention is not to be restricted. The right is reserved to make such changes or alterations as the actual reduction to practice may suggest, in so far as such changes or alterations are compatible in spirit with the annexed claim.

The same numerals of reference designate the same parts throughout the several figures of the drawings, wherein:

Figure 1 is a view in side elevation showing the improved apparatus mounted adjacent the forward end of an auto vehicle.

Fig. 2 is a top plan view of the structure of Fig. 1.

Fig. 3 is a rear elevational view of the frame supporting the mechanism of the device.

Fig. 4 is a perspective view of a section of the battery of rotary knives or cutlasses.

Referring to the drawings, the invention is shown mounted on an auto vehicle 1, and comprises a frame consisting of the rail 2 which is disposed transversely with reference to the vehicle, this rail being provided with the upstanding bearing supports 3 arranged in pairs, each pair carrying the stationary shaft 4 near their upper ends. The rail 2 extends laterally from both sides of the vehicle to provide means for the attachment of brace members hereinafter described. Mounted upon the shafts 4 there are bearing members 6 which are movable longitudinally along the shafts and these bearing members have pivotally connected to them the arms 7, the arms connecting with the bearing members at one end and at the other end pivotally connecting with a collar member 8 on diametrically opposite sides of the latter. The collar member "8" is carried by one end of a tubular member 9 which is formed at one end with the forked member 10, the latter near the extremities of its legs being formed with appropriate bearings for the support of the transversely disposed shaft 11, the latter carrying the knives or cutlasses 12 disposed on diametrically opposite sides of the shaft, and at uniformly spaced intervals therealong. At the ends of the shaft 11 there are carried the cutting disks 13.

The tubular member 9 is suitably braced between the collar member 8 and its forked member 10, and to this end there are provided the lattice work brace members 14. These brace members 14 at one end pivotally connect with the tubular member and at the other ends with the extremities of the sill 2 by means of staples as indicated at 15.

The tubular member 9 is adapted to swing from a position substantially in a horizontal plane to a position at an acute angle to the horizontal plane. Thus the shaft 11 is raised and lowered with the resultant raising and lowering of the cutlasses 12 and disks 13 when the device is in operation. To effect this there is mounted on the sill 2 at an intermediate point a support 16 on top of which there is carried a toothed sector 17, the latter having pivotally mounted thereon a hand lever 18 having a spring latch 19 which engages between the teeth of the sector. This lever 18 connects with the brace members 14, connecting rods 20 being provided for the purpose and pivotally attached to the lever 18 at one end, the opposite ends being pivotally connected with the brace members 14, as indicated at 21.

A pair of pivotally connected links 22 have their extremities pivotally connected with the arms 7 and as the arms are moved to increase or decrease their spread, the angle of these links is increased or diminished. The purpose of this arrangement appears hereinafter.

As a means for rotating the shaft 11, the latter carries a bevel gear 23 mounted on it between the legs of the forked member 10. This bevel gear meshes the bevel pinion 24 carried at one end of a shaft 25, the latter passing through the tubular member 9 and being rotatably mounted therein, the remaining end of the shaft connecting with a universal joint 26, with which there connects one end of a sectional telescopic shaft 27, the remaining end of this telescopic shaft connecting with the universal joint 28 which in turn connects with a vertically disposed shaft 29, the latter having its upper end journaled in a bracket 30 which depends from the under face of the sill 2. The shaft 29 has a thrust bearing in the end of a laterally projecting arm 31 carried by a support 32 attached to the under face of the sill 2, and this support 32 carries an arm 33 which provides a bearing for the shaft 29 at an intermediate point.

The support 32 carries a horizontally disposed shaft 34 and the latter is designed to be set in motion by a pulley 35 to which a belt (not shown) is led from some driving means (not shown). Obviously, a gear or a sprocket wheel may be used in place of the pulley 35 to secure rotation of the shaft 34. A bevel gear couple consisting of the driven gear 36 and the driver 37 operatively connect the shafts 34 and 29.

It is apparent that motion transmitted to the shaft 34 will effect rotation of the shaft 11 with the consequent rotation of the knives or cutlasses 12 and the cutting disks 13 and rotation imparted to these members will serve to convert the device into an effective mechanism for offensive operation in warfare.

The hand lever 18 previously referred to serves as a means for elevating and lowering the shaft 11 so that the positions of the cutlasses 12 and disks 13 may be changed with reference to the ground. Swinging the lever 18 backwardly will effect the raising of the forward end of the tubular member 9 with the consequent raising of the shaft 11, and as this is accomplished the two arms 7 will spread apart, the bearing members 6 sliding along their attendant shafts toward the outboard bearing members 3 and the shaft 27 as a consequence of its telescopic construction being made shorter. The throwing forward of the lever 18 effects the reversing of this operation, the bearing members 6 moving in the opposite directions along their shafts to move the arms 7 toward each other and sectional shaft 27 lengthening out.

The pivotally connected links 22 serve to secure the two arms 7 each in the same position with respect to its attendant arm.

The invention having been described, what is claimed as new and useful is:

In an apparatus of the kind set forth, a transversely disposed shaft provided with a plurality of radially disposed knives, a tubular member formed with a forked end in the bearings of which the said shaft is rotatably mounted, a shaft rotatably mounted in the tubular member and a gear couple operatively connecting the two shafts, a transversely disposed sill, bearing supports mounted on the sill and arranged in pairs, the sockets of each bearing carrying a stationary shaft, bearing members slidably engaging the said stationary shafts, arms pivotally connected with the tubular member at the end remote from the transversely disposed shaft, said arms being respectively connected to the bearing members, a pair of pivotally connected links having their extremities pivotally connected to said arms at substantially intermediate points, driving means, a universal joint connection between said driving means and the rotatable shaft within the tubular member, brace members pivotally connected respectively at the opposite ends of the sill and also pivotally connected to the tubular member on opposite sides thereof at substantially intermediate points and means operatively connected with the bracing members for raising and lowering the forked end of the tubular member with the transverse shaft for the purpose specified.

In testimony whereof I affix my signature.

ANDREW I. FUSMAN.